United States Patent

Crecelius

[15] 3,655,252
[45] Apr. 11, 1972

[54] SUPPORT MEANS FOR MOUNTING A BEARING ASSEMBLY

[72] Inventor: William J. Crecelius, Springfield, Pa.

[73] Assignee: SKF Industries, Inc., King of Prussia, Pa.

[22] Filed: Jan. 13, 1971

[21] Appl. No.: 106,087

[52] U.S. Cl. ..........................................................308/236
[51] Int. Cl. ......................................................F16c 35/06
[58] Field of Search ................................................308/236

[56] References Cited

UNITED STATES PATENTS 3,339,991   9/1967   Howe, Jr. ................................308/236

*Primary Examiner*—Edgar W. Geoghegan
*Assistant Examiner*—Frank Susko
*Attorney*—Howson & Howson

[57] ABSTRACT

The combination comprising means for mounting a rolling bearing assembly in a housing or the like, said rolling bearing assembly comprising inner and outer ring members spaced apart to define an annular space, said rings having confronting circumferentially extending raceways for a plurality of rolling elements, means defining a pocket in the housing, means defining an opening extending through one of said rings, a locking screw member having a generally cylindrical shank and an enlarged head, said shank having at least one helical projection, said locking screw member being of a material having a hardness less than the hardness of said one ring whereby upon insertion of the shank into said opening said helical projection is deformed to seat the locking screw member in place and seal said opening, the head of said screw member projecting into the pocket in said housing to prevent relative rotation of said one ring in said housing.

4 Claims, 3 Drawing Figures

Patented April 11, 1972

3,655,252

INVENTOR:
WILLIAM J. CRECELIUS, JR.
BY Howson & Howson
ATTYS.

SUPPORT MEANS FOR MOUNTING A BEARING ASSEMBLY

The present invention relates to support means for mounting a bearing assembly in a housing or the like.

At present, various means are employed to support a bearing assembly in the bore of a housing in a manner to prevent relative rotation of the outer ring relative to the housing. For example, one means consists in mounting a steel ball in a spherical hole in the outer ring, which hole is of a diameter slightly larger than the ball. The depth of the hole is such that a small sector of the ball protrudes beyond the outer diameter of the outer ring. The outer ring is then staked around the periphery of the opening to retain the ball in place. This arrangement has the disadvantage of requiring a precision machining operation for forming the hole for the ball and it has also been found that the staking operation may result in setting up harmful stresses in the outer ring.

Other known means for mounting a bearing assembly in a housing include the use of axial splines, flats, keyways, clamps and the like. These arrangements generally are not completely satisfactory for the reason that they add to the expense of manufacture and assembly.

The present invention provides a new and improved means for mounting a bearing assembly in a housing consisting of a drive screw having a series of splines on the shank, which drive screw is adapted to be force-fitted into a radial opening extending through the outer ring. The drive screw is preferably of a hardness which is less than that of the bearing outer ring so that when it is forced into the outer ring there is no danger of cracking the bearing outer ring and setting up harmful stresses which would adversely affect the life of the bearing. The splines deform upon insertion of the drive screw shank into the opening to provide a tight fit holding the drive screw in place and covering the opening thereby eliminating the possibility of penetration of dirt and foreign matter into the interior of the bearing. This is an important consideration since dirt and foreign matter can adversely affect bearing life. The head of the drive screw projects into a slot into the housing which limits rotational movement of the bearing assembly relative to the housing. The strength of the drive screw is enhanced by the friction between the head and the outer diameter surface caused by the axial component of the holding force between the screw head and the housing.

In view of the above, it is readily apparent that the present invention has several distinct advantages over prior methods for mounting a bearing assembly in a housing or the like. For example, in accordance with the present invention a broader tolerance between the outer ring and the opening in the housing for the bearing is facilitated. This eliminates the danger of too tight a fit which may distort or crack the bearing outer ring. Additionally, the mounting means of the present invention can be inserted into the outer ring with relatively little force thereby eliminating the possibility of inducing harmful stresses in the bearing assembly or cracking of the hardened outer ring. The mounting force is sufficiently small to allow the drive screw to be inserted in the assembled bearing without damage to the highly finished rolling element and raceway bearing surfaces, thus providing convenience in assembly. Moreover, in accordance with the present invention, it is simply necessary to drill a through hole into the outer ring instead of to a controlled depth as in prior arrangements which is a more expensive operation. In the present instance, the drive screw head will control the depth to which the drive screw can be driven into the outer ring and protrude from the O.D. surface sufficiently to engage the sides of the axial slot in the housing to serve the purpose of preventing relative rotation of the outer ring in the housing.

These and other objects of the present invention and the various features and details of the construction and function thereof are hereinafter more fully set forth with reference to the accompanying drawing, wherein.

Figure 1:
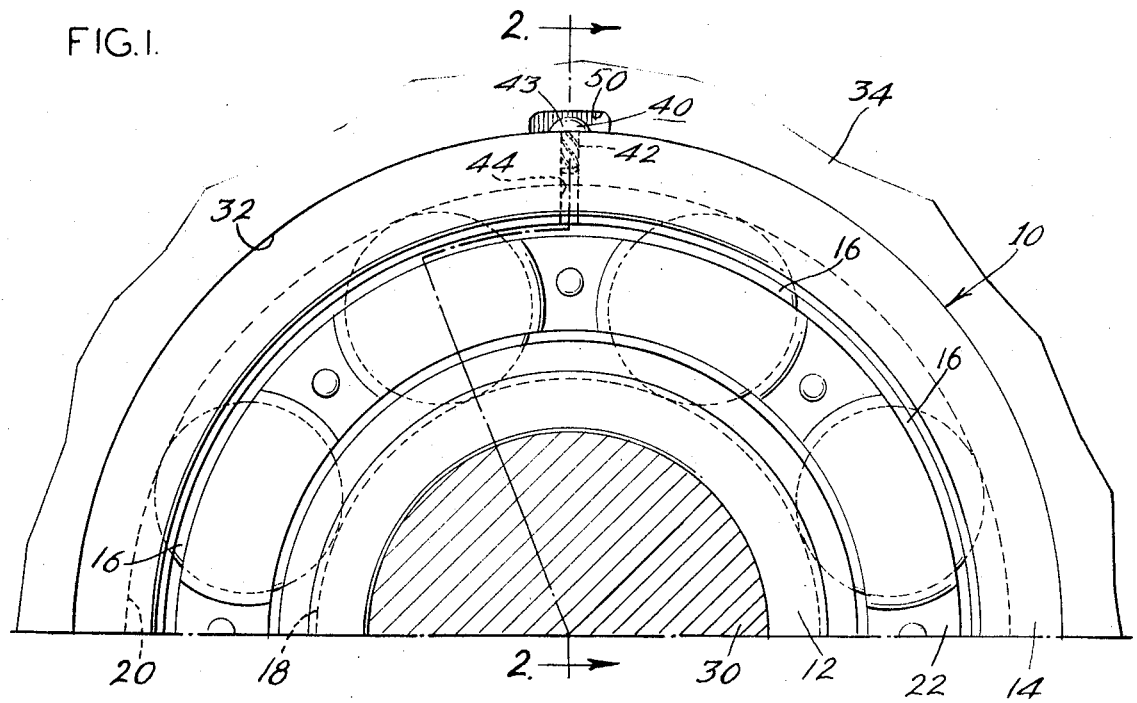
FIG. 1 is a fragmentary side elevational view of a bearing assembly mounted in a housing with the seal removed.
Figure 2:
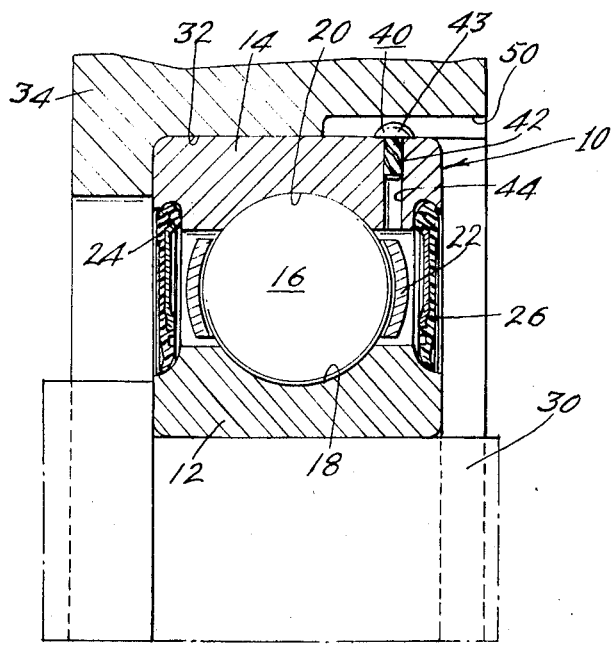
FIG. 2 is a sectional view taken on lines 2—2 of FIG. 1.
Figure 3:
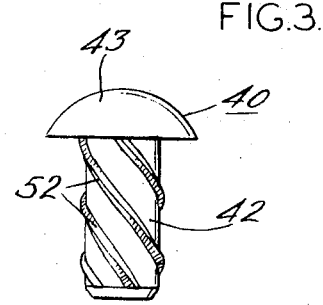
FIG. 3 is a side elevational view of a drive screw of the present invention.

Referring now to the drawing, there is illustrated a conventional bearing assembly generally designated by the numeral 10 which comprises the usual inner and outer rings 12 and 14 which are axially spaced apart to define an annular chamber for the rolling elements 16. In the present instance, the rings 12 and 14 have confronting raceways 18 and 20 of arcuate configuration to accommodate the balls 16. A conventional separator 22 spaces the ball circumferentially between the rings. Opposite axial ends of the bearing are sealed by means of conventional seals 24 and 26. The inner ring, as illustrated, is mounted on a shaft member 30 or the like and the outer ring engages in an opening 32 in a housing 34.

In accordance with the present invention, means is provided for supporting the bearing assembly in the housing in a manner limiting relative rotation of the outer ring and the stationary housing 34. This means, as illustrated, comprises a locking screw member 40 having a generally cylindrical shank 42 and an enlarged head 43, the screw member engaging in a radial opening 44 in the outer ring with its head protruding above the outer surface of the outer ring and engaging in an axial slot 50 in the housing. As illustrated, the hole 44 extends through the entire thickness of the outer ring 14 and is disposed adjacent one axial end thereof so that the inner end of the opening is disposed away from the raceway. In the present instance, the shank is provided with a plurality of helical projections or threads 52 which are adapted to deform upon insertion of the locking screw into the opening 44 thereby providing a tight fit seating the locking screw in place and also sealing the opening to prevent ingress of dirt and foreign matter into the annular space of the bearing. The locking screw member is preferably made of a hardness less than the hardness of the outer ring to effect deformation of the helical splines 52 upon insertion of the locking screw into the opening or hole 44. In a typical installation, the drive screw is made of a diameter D of about 0.073 inches and the opening 44 is of a diameter to provide a 0.003 inch interference between the hole inner diameter and the outer diameter of the splines 52.

In summary, therefore, the present invention provides a relatively economical and effective means for mounting a bearing assembly in a housing in a manner to limit relative rotational movement of the outer ring in the housing. In accordance with the present invention, the cost of the assembly is minimized by the use of a through hole 44 which extends the entire thickness of the outer ring as contrasted with some prior arrangements wherein the opening must be of a controlled depth and requires a staking operation to locate a ball member or the like in the gauged opening. Additionally, in accordance with the arrangement of the present invention, the opening 44 is completely sealed by the splines 52 when the screw member is force-fitted into the opening. Additionally, by reason of the relative hardness of the locking screw member in the outer ring, there is no danger of setting up stresses which would adversely affect the bearing life as may be the case in prior arrangements discussed above. Moreover, in accordance with the present invention, the locking screw member can be assembled after the complete bearing has been assembled, whereas in some prior arrangements it was necessary to assemble the locking member to the outer ring prior to assembly of the elements of the bearing.

What is claimed is:

1. The combination comprising means for mounting a rolling bearing assembly in a housing or the like, said rolling bearing assembly comprising inner and outer ring members spaced apart to define an annular space, said rings having confronting circumferentially extending raceways for a plurality of rolling elements, means defining a pocket in the housing, means defining an opening extending through one of said rings, a locking screw member having a generally cylindrical shank and an enlarged head, said shank having at least one helical projection, said locking screw member being of a material having a hardness less than the hardness of said one ring whereby upon insertion of the shank into said opening said helical projection is deformed to seat the locking screw member in place and seal said opening, the head of said screw member projecting into the pocket in said housing to prevent relative rotation of said one ring in said housing.

2. The combination as claimed in claim 1 wherein said opening is disposed adjacent one axial end of said bearing with the inner end of said opening away from the raceway in said one ring.

3. The combination as claimed in claim 1 wherein said helical projection extends at least the circumference of said shank.

4. The combination of claim 1 wherein the diameter of said opening and the maximum diameter of the trace of said helical projection provides about a 0.003 inch interference.

* * * * *